United States Patent [19]

Bothe et al.

[11] Patent Number: 4,734,317

[45] Date of Patent: Mar. 29, 1988

[54] BIAXIALLY ORIENTED POLYOLEFIN MULTI-LAYER FILM

[75] Inventors: Lothar Bothe, Mainz-Gonsenheim; Guenther Crass, Taunusstein, both of Fed. Rep. of Germany

[73] Assignee: Hoechst Aktiengesellschaft, Frankfurt am Main, Fed. Rep. of Germany

[21] Appl. No.: 836,321

[22] Filed: Mar. 5, 1986

[30] Foreign Application Priority Data

Mar. 15, 1985 [DE] Fed. Rep. of Germany ....... 3509384

[51] Int. Cl.$^4$ .................... B32B 27/08; B29C 45/16; B65B 11/00
[52] U.S. Cl. .................................. 428/215; 428/349; 428/447; 428/451; 428/516; 264/211.12; 53/396
[58] Field of Search ............... 428/349, 516, 910, 447, 428/451, 215, 35; 53/396; 525/240; 264/211.12

[56] References Cited

U.S. PATENT DOCUMENTS

| | | | |
|---|---|---|---|
| 4,297,415 | 10/1981 | Ward et al. | 428/516 |
| 4,302,504 | 11/1981 | Lansbury et al. | 428/516 |
| 4,419,411 | 12/1983 | Park | 428/516 |
| 4,477,506 | 10/1984 | Wang | 428/349 |
| 4,502,263 | 3/1985 | Crass et al. | 53/396 |
| 4,565,739 | 1/1986 | Clauson et al. | 428/516 |
| 4,590,125 | 5/1986 | Balloni et al. | 428/516 |
| 4,595,625 | 6/1986 | Crass et al. | 428/349 |
| 4,604,324 | 8/1986 | Nahmias et al. | 428/349 |

*Primary Examiner*—John E. Kittle
*Assistant Examiner*—James J. Seidleck
*Attorney, Agent, or Firm*—Schwartz, Jeffery, Schwaab, Mack, Blumenthal & Evans

[57] ABSTRACT

A polyolefin film having a base layer composed essentially of propylene polymers and having sealing layers present on both sides, composed essentially of sealable olefin polymers. Polydialkylsiloxane is incorporated in a first of the two sealing layers, and this layer is not subjected to corona treatment. The second sealing layer is subjected to corona treatment and has polydialkylsiloxane, not incorporated, but present on its outer surface, the polydialkylsiloxane having been transferred to this layer by contact with the sealing layer in which polyidalkylsiloxane is incorporated. The relative polydialkylsiloxane occupancy on the second layer, which is determined by means of ESCA spectroscopy, is not more than 15. The three-layer polyolefin film is prepared by a coextrusion process. It is particularly suitable for use as a packaging film on high-speed packaging machines.

17 Claims, No Drawings

BIAXIALLY ORIENTED POLYOLEFIN MULTI-LAYER FILM

BACKGROUND OF THE INVENTION

The invention relates to a biaxially oriented polyolefin film which can be sealed on both sides and is composed of three layers, the base layer being composed essentially of propylene polymers and the two sealing layers being essentially composed of sealable olefin polymers. The film is distinguished by universal applicability to high-speed packaging machines and is also readily printable. The invention also relates to a process for the preparation of the film and to its use.

European Patent Application No. 0,008,904 discloses a biaxially oriented, three-layer polyolefin film which can be sealed on both sides and in which the base layer is formed by propylene polymers and the two sealing layers (outer layers or top layers) are formed by sealable olefin polymers. Although this polyolefin film has good heat-sealability, it has, in particular, only a low scratch resistance, cannot be printed and also leaves much to be desired with respect to transparency and slip properties in regard to high-speed packaging machines.

U.S. Pat. No. 4,502,263 discloses a biaxially oriented polyolefin film composed of three layers which is transparent and particularly readily sealable. Its base layer is composed essentially of a propylene polymer, and the two sealing layers are composed of an appropriate olefin polymer containing, as additives, 5 to 15% by weight of a low-molecular resin which is compatible with the olefin polymer, 5 to 15% by weight of a propylene homopolymer and 0.3 to 1.5% by weight of polydiorganosiloxane, the percentages by weight relating in each case to the sealing layer. This polyolefin multilayer film possesses characteristics which are important for packaging films, namely a wide range of sealing, a low sealing temperature, high gloss and good transparency, a relatively high scratch resistance and low friction and hence good running characteristics on high-speed packaging machines of various types. However, it lacks a characteristic which is also important, namely good printability.

A biaxially oriented polyolefin film which can be sealed on both sides and has three layers is also disclosed in U.S. Pat. No. 4,419,411. In the case of this film too, an additive combination is incorporated in both of the sealing layers. They each contain 0.15 to 0.4% by weight of polysiloxane and 0.05 to 0.5% by weight of silicon dioxide, the percentages by weight relating in each case to the sealable layer. The base layer is composed of polypropylene (as the main component) and contains a small amount of a monocarboxamide. Part of the amide migrates from the base layer into the two sealing layers and onto the surface thereof (external face), so that polysiloxane, silicon dioxide and the monocarboxamide are present in incorporated form in each sealing layer, and the monocarboxamide is also present on the outer faces of the two sealing layers. The polyolefin multi-layer film described is stated to have a particularly low coefficient of friction. However, this film too suffers in particular from the disadvantage that it is not printable.

DISCLOSURE OF THE INVENTION

Accordingly, it is an object of the invention to provide a biaxially oriented polyolefin film which can be sealed on both sides.

It is another object of the invention to provide a polyolefin film, as above, which is composed of three layers.

It is yet another object of the invention to provide a polyolefin film, as above, having high scratch resistance.

It is still another object of the invention to provide a polyolefin film, as above, having good slip properties and transparency.

It is yet another object of the invention to provide a polyolefin film, as above, having good printability.

These objects are achieved by a biaxially oriented multilayer polyolefin film which comprises a polypropylene base layer, a first polyolefin sealing layer positioned on one side of the base layer, and containing from about 0.5% to about 3% by weight of incorporated polydialkylsiloxane, the first sealing layer not being subject to corona treatment, and a second polyolefin sealing layer positioned on the other side of the base layer and having a coating of the polydialkylsiloxane on its outer surface, the second sealing layer being subject to corona treatment, wherein the polydialkylsiloxane coating is formed by contact of the first and second sealing layers. The relative polydialkylsiloxane occupancy of the second sealing layer is not more than about 15 as determined by means of Electron Spectroscopy for Chemical Analysis (ESCA).

The objects of the invention are also achieved by a process for producing the above polyolefin film, which includes the steps of coextruding a plurality of melts corresponding to individual layers of a multilayer film through a flat die, cooling the coextruded film to solidify it, stretching the film biaxially at a longitudinal stretching ratio of from about 4:1 to about 7:1 and at a transverse stretching ratio of from about 8:1 to about 10:1, heat-setting the biaxially stretched film, subjecting the second sealing layer to corona treatment, and winding the film in a manner such that the first and second sealing layers contact each other.

DETAILED DESCRIPTION OF THE PREFERRED EMBODIMENTS

The three-layer polyolefin film according to the invention, in which the base layer is composed essentially of propylene polymers and the two sealing layers are composed essentially of sealable olefin polymers, contains, in incorporated form, in a sealing layer of from about 0.5 to about 3% by weight, preferably from about 0.8 to about 2% by weight, relative to the layer, of polydialkylsiloxane, this sealing layer not having been subjected to corona treatment, and the other sealing layer having been subjected to corona treatment and having the polydialkylsiloxane not in an incorporated form, but present on its outer face, the polydialkylsiloxane having been transferred by contact between the two sealing layers, and the relative polydialkylsiloxane occupancy of the corona-treated outer face being not more than 15, preferably 2 to 10, determined by means of ESCA spectroscopy.

The new polyolefin film is based on a number of inventive considerations and actions. The effect of the polydialkylsiloxane not being incorporated in one of the two sealing layers, but present as a coating (on the outer surface thereof) and of this sealing layer having been subjected to corona treatment before being coated with polydialkylsiloxane is that the film according to the invention is printable on this layer and, at the same time, also possesses all the other important characteristics mentioned above. The present invention thus indicates a route by means of which it is possible, in a simple manner, namely by contact between one sealing layer in which polydialkylsiloxane has been incorporated with the outer surface of the other of the two sealing layers, to combine corona treatment and the presence of polydialkylsiloxane in one sealing layer and to achieve jointly the effects thereby hoped for (good printability, good slip characteristics and good sealability), without having to accept any disadvantageous effects on further important characteristics.

The amount of polydialkylsiloxane transferred to the outer face of a sealing layer constitutes only a relatively small fraction of the polydialkylsiloxane incorporated in the other sealing layer. Accordingly, the amount of polydialkylsiloxane added to the olefin polymer of a sealing layer, from about 0.5 to about 3% by weight, preferably from about 0.8 to about 2% by weight (the percentages by weight relating to the total weight of the layer), is not substantially decreased by the transfer mentioned. If the value, determined by means of ESCA spectroscopy, of relative occupancy of the outer face is more than 15, there is already so much polydialkylsiloxane present that problems of process technology could arise when the film is used. On the other hand, the slip properties of the film can be impaired at very low values. Accordingly, the relative polydialkylsiloxane occupancy is preferably 2 to 10.

The said occupancy with polydialkylsiloxane is effected by contact between the two sealing layers. Contact between the sealing layers exists, for example, when the film, after being prepared, is wound up at the temperature then prevailing (as a rule approximately room temperature), because in the course of this the two sealing layers are placed one above the other with close mutual contact. The transfer intended is, in addition, also promoted by the fact that the two sealing layers are in contact at the pressure generated by winding up. It has been found that the transfer of polydialkylsiloxane takes place after only a short period of contact and that the required occupancy is present. The polydialkylsiloxane incorporated in one of the two sealing layers preferably has 1 to 4 carbon atoms in the alkyl group and has a viscosity of at least about 100 mm$^2$/second at 25° C., preferably from about 1,000 to about 100,000 mm$^2$/second and especially from about 5,000 to about 50,000 mm$^2$/second (the viscosity range of, for example, 1,000 to 100,000 mm$^2$/second at 25° C. corresponds to an average molecular weight of about 25,000 to about 103,000). Polydimethylsiloxane is particularly preferred.

The base layer of the multi-layer film according to the invention is composed of a propylene polymer which is predominantly composed of propylene and has a melting point of about 140° C. or higher, preferably from about 150° to about 170° C. Isotactic polypropylene having an n-heptane-soluble proportion of about 15% by weight or less, copolymers of ethylene and propylene having an ethylene content of about 10% by weight or less, and copolymers of propylene and $C_4$–$C_8$ α-olefins having an α-olefin content of about 10% by weight or less constitute preferred propylene polymers for the base layer, isotactic polypropylene being particularly preferred. In general, the propylene polymer of the base layer has a melt flow index of from about 0.5 g/10 minutes to about 10 g/10 minutes, preferably from about 1.5 g/10 minutes to about 4 g/10 minutes, at 230° C. and at a loading of 2.16 kg (DIN 53,735).

The sealing layers of the multi-layer film according to the invention are composed of sealable olefinic polymers. Suitable olefin polymers are ethylene homopolymers, copolymers formed from ethylene and propylene or ethylene or propylene and butylene or another α-olefin having 5 to 10 carbon atoms, terpolymers formed from ethylene, propylene and butylene or another α-olefin having 5 to 10 carbon atoms, or mixtures of these polymers. It is preferable to employ ethylene/propylene copolymers, ethylene/butylene copolymers, propylene/butylene copolymers, ethylene/propylene/butylene terpolymers or mixtures of these polymers. Olefin polymers which are particularly preferred for the sealing layers are ethylene/propylene copolymers having propylene as the main component and an ethylene content of from about 2 to about 10% by weight (relative to the copolymer), propylene/butylene copolymers having propylene as the main component and a butylene content of from about 0.5 to about 25% by weight (relative to the copolymer) and ethylene/propylene/butylene terpolymers having propylene as the main component and from about 0.5 to about 7% by weight of ethylene and from about 5 to about 30% by weight of butylene (the percentages by weight relate to the terpolymer) and also mixtures of these polymers.

The olefin polymer of the sealing layers has a lower melting point than the propylene polymer of the base layer. The melting point of the olefin polymer is, in general, within the range from about 80° to about 160° C., preferably from about 100° to about 140° C. The melt flow index of the olefin polymer is higher than that of the propylene polymer of the base layer. The olefin polymer for the sealing layres has a melt flow index of, in general, from about 1 to about 12 g/10 minutes, preferably from about 3 to about 9 g/10 minutes, at 230° C. and a loading of 2.16 kg (DIN 53,735). For the corona treatment, which can be carried out by one of the known methods, it is preferably to use a procedure in which the film is passed between two conductor elements acting as electrodes, and to apply, between the elecrodes, a voltage, in most cases an alternating voltage, sufficiently high (about 10,000 volt and 10,000 Hertz) to enable spray or corona discharges to take place. As a result of the spray or corona discharges, the air above the surface of the foil becomes ionized and combines with the molecules on the surface of the foil, so that polar incorporations are formed in the essentially nonpolar polymer matrix. In accordance with the invention, of the two sealing layers, only the layer in which the olefin polymer does not contain polydialkylsiloxane, i.e., the sealing layer in which polydialkylsiloxane has not been incorporated, is subjected to corona treatment.

In order to improve even further certain properties of the polyolefin film according to the invention, it is possible for both the base layer and the two sealing layers to contain appropriate additives in an effective amount in each case, preferably antistatic agents, antiblocking agents, slip agents, stabilizers and/or low-molecular resins, which are compatible with the polymers of the base layer and of the sealing layers.

Preferred antistatic agents are alkali metal alkanesulfonates, polyether-modified polydiorganosiloxanes, i.e., ethoxylated and/or propoxylated polydiorganosiloxanes (polydialkylsiloxanes, polyalkylphenylsiloxanes and the like) and/or essentially linear and saturated, aliphatic, tertiary amines containing an aliphatic radical having 10 to 20 carbon atoms and substituted by 2 hydroxyalkyl-($C_1$–$C_4$) groups, amongst which N,N-bis-(2-hydroxyethyl)-alkylamines having $C_{10}$–$C_{20}$ groups, preferably $C_{12}$–$C_{18}$ groups, as the alkyl groups are particularly suitable. The effective amount of antistatic agent is within the range from about 0.05 to about 3% by weight, relative to the layer. In the event that polyether-modified polysiloxane is employed, this is only added to the polymer for the base layer and/or to the polymer of the layer, out of the two sealing layers, which is intended as a layer in which polydialkylsiloxane has been incorporated.

Suitable antiblocking agents are inorganic additives, such as silicon dioxide, calcium carbonate, magnesium silicate, aluminum silicate, calcium phosphate and the like, nonionic surfactants, anionic surfactants and/or incompatible organic polymers, such as polyamides, polyesters, polycarbonates, and the like. The effective amount of anti-blocking agent is within the range from about 0.1 to about 2% by weight, relative to the layer.

Examples of slip agents are higher aliphatic acid amides, higher aliphatic acid esters, waxes and metal soaps. The effective amount of slip agent is within the range from about 0.1 to about 2% by weight, relative to the layer.

Stabilizers which can be employed are the customary compounds which have a stabilizing action on ethylene, propylene and other α-olefin polymers. The effective amount is, in general, from about 0.1 to about 2% by weight, relative to the layer. The low-molecular resin recommended is a natural or synthetic resin having a softening point of from about 60 to about 180° C., preferably from about 80 to about 130° C. (determined as specified in DIN 1995-U 4). Amongst the numerous low-molecular resins, the hydrocarbon resins are preferred, specifically in the form of petroleum resins, styrene resins, cyclopentadiene resins and terpene resins (these resins are described in Ullmanns Enzyklopadie der Techn. Chemie ,*Ullmann's Encyclopedia of Industrial Chemistry.*, 4th Edition, Volume 2, pages 539 to 553).

The petroleum resins are hydrocarbon resins prepared by polymerizing deep-decomposed petroleum materials in the presence of a catalyst. These petroleum materials usually contain a mixture of resin-forming substances, such as styrene, methylstyrene, vinyltoluene, indene, methylindene, butadiene, isoprene, piperylene and pentylene. Styrene resins are low-molecular homopolymers of styrene or copolymers of styrene with other monomers, such as α-methyl-styrene, vinyltoluene and butadiene. The cyclopentadiene resins are cyclopentadine homopolymers or cyclopentadiene copolymers obtained from coal tar distillates and fractionated petroleum gas. These resins are prepared by subjecting the materials containing cyclopentadiene to a high temperature for a very long time. Depending on the reaction temperature, it is possible to obtain dimers, trimers or high polymers. The terpene resins are polymers of terpenes, i.e., hydrocarbons of the formula $C_{10}H_{16}$, which are present in nearly all the essential oils and oil-containing resins of plants, and phenol-modified terpene resins. Special examples of terpenes which should be mentioned are α-pinene, α-pinene, dipentene, limonene, myrcene, bornylene, camphene and similar terpenes. The hydrocarbon reins can also comprise the so-called modified hydrocarbon resins. Modification is generally effected by reacting the raw materials before polymerization, by introducing special monomers or by reacting the polymerized product, the reactions carried out being, in particular, hydrogenations or partial hydrogenations. The hydrocarbon resins employed are preferably styrene homopolymers, styrene copolymers, cyclopentadiene homopolymers, cyclopentadiene copolymers and/or terpene polymers having a softening point in each case of from about 60° to about 180° C., preferably from about 80° to about 130° C. (in the case of the unsaturated polymers the hydrogenated product is preferred). The effective amount of low-molecular resin is from about 3 to about 15% by weight, preferably from about 5 to about 10% by weight, relative to the layer.

It has proved to be particularly advantageous to combine the low-molecular resin with a propylene homopolymer having a melting point of up to about 165° C., preferably with an isotactic polypropylene, in an amount of from about 3 to about 15% by weight, preferably from about 5 to about 10% by weight, relative to the layer, it being preferable to employ the resin and the propylene homopolymer in approximately equal amounts in each case.

In accordance with a preferred embodiment of the polyolefin multi-layer film according to the invention, at least one sealing layer contains from about 3 to about 15% by weight, preferably from about 5 to about 10% by weight, of the said natural or synthetic resins having a softening point of from about 80° to about 130° C., and from about 3 to about 15% by weight, preferably from about 5 to about 10% by weight, of a propylene homopolymer having a melting point of up to about 165° C., the percentages by weight relating to the layers.

In accordance with a further preferred embodiment, the base layer (in which the main component is a propylene homopolymer) and/or at least one sealing layer contain an N,N-bis-(2-hydroxyethyl)-($C_{10}$–$C_{20}$)-alkylamine, a polyether-modified polydiorganosiloxane or a mixture of these two, as an antistatic agent. It goes without saying that the two sealing layers of the polyolefin film according to the invention may be principally comprised of the same polymers or of different polymers.

Insofar as it is suitable, the base layer and/or the sealing layers also contain the other additives mentioned above, preferably slip agents and antiblocking agents, in each case in an effective amount.

The thickness of the polyolefin multi-layer film according to the invention can vary within wide limits and depends especially on the intended use. Its total thickness is, in general, from about 10 to about 50 μm, preferably from about 20 to 40 μm, the sealing layers, which generally have the same thickness, being in each case from about 0.2 to about 3 μm, preferably from about 0.5 to about 1.5 μm, thick (the thickness of the base layer constitutes about 50 to 90% of the total thickness).

The preparation of the polyolefin film according to the invention, which is composed of three layers, is effected by the known coextrusion process. Within the scope of this process the procedure followed is to coextrude the melts corresponding to the individual layers of the film through a flat die, to cool the film obtained by coextrusion in order to solidify it, to stretch (orient) the film biaxially, to heat-set the biaxially stratched film and to subject to corona treatment the sealing layer scheduled for corona treatment. The biaxial stretching (orientation) can be carried out simultaneously or successively, successive biaxial stretching, in which stretching is first carried out longitudinally (i.e., in the direction of the machine ) and then transversely (i.e., transversely to the direction of the machine), being preferred. Consequently, as in the conventional coextrusion process, the polymers or the polymer mixtures of the divisional layers are first compressed or plastified in an extruder. The melts are then forced simultaneously throgh a flat die (slot die), and the multi-layer film which has been forced out is cooled and solidified on one or more rolls which are kept at about 30° to 50° C. by cooling. The film thus obtained is then stretched longitudinally and transversely to the direction of extrusion, which results in orientation of the molecular chains. It is preferable to stretch in a ratio of from about 4:1 to about 7:1 in the longitudinal direction and preferable to stretch in a ratio of from about 8:1 to about 10:1 in the transverse direction The longitudinal stretching is carried out at a film temperature of, preferably, from about 120° to about 140° C., and the transverse stretching is preferably carried out at from about 160° to about 175° C. It will be preferable to carry out the longitudinal stretching by means of two rollers running at different speeds, corresponding to the stretching ratio desired, and to carry out the transverse stretching by means of an appropriate tenter frame. After the film has been stretched biaxially it is heat-set (subjected to heat treatment). In this process the film is kept at a temperature of from about 150° to about 160° C. for about 0.5 to about 10 seconds. The corona treatment is preferably carried out by means of an alternating voltage of about 10,000 volts and 10,000 Hertz. The film prepared in this way is wound up in a customary manner by means of a take-up unit.

The polyolefin multi-layer film according to the invention is particularly suitable for use as a packaging film on high-speed packaging machines. This is because it possesses all the important properties demanded from polyolefin films in respect of use on high-speed machines. In particular, it can be sealed on both sides and has a high scratch-resistance, excellent running characteristics and at the same time good printability.

The invention will now be illustrated in greater detail by means of examples:

The examples and comparison examples below relate in each case to a biaxially oriented (longitudinal stretching ratio 5:1, transverse stretching ratio 10:1) polyolefin film having a base layer and two sealing layers, the base layer being composed of an isotactic polypropylene having a fraction soluble in n-heptane of 5% by weight, a melting point of 165° C. and a melt flow index of 2 g/10 minutes at 230° C. and 2.16 kg loading (DIN 53,735) as the main component. The base layer is about 19 μm thick, and the two sealing layers surrounding the base layer are each about 1 μm thick. The three-layer polyolefin films have been prepared by the known coextrusion process.

EXAMPLE 1

A sealing layer is composed of a (random) ethylene/propylene copolymer containing 4.5% by weight of ethylene, to which 0.8% by weight of polydimethylsiloxane having a viscosity of 30,000 mm²/second at 25° C. has been added. This sealing layer has thus been formed from 99.2% by weight of the said copolymer (composed of 95.2% by weight of propylene and 4.5% by weight of ethylene) and 0.8% by weight of the said polysiloxane. The other sealing layer is composed of the same ethylene/propylene copolymer and contains no incorporated polysiloxane. This sealing layer has been subject to corona treatment. After the three-layer polyolefin film has been prepared and wound up, a relative polydimethylsiloxane occupancy of 4 on the corona-treated sealing layer has been determined by means of ESCA spectroscopy.

EXAMPLE 2

A sealing layer is composed of a mixture of polymers composed of 50% by weight of a propylene/butylene copolymer and 50% by weight of an ethylene/propylene/butylene terpolymer containing 0.7% by weight of ethylene, 81.3% by weight of propylene and 18% by weight of butylene (the percentages by weight relating to the polymer mixture), and of 1.5% by weight of polydimethylsiloxane having a viscosity of 30,000 mm²/second at 25° C. This sealing layer has thus been formed from 98.5% by weight of the said polymer mixture and 1.5% by weight of the said polysiloxane. The other sealing layer is composed of the same polymer mixture and contains no incorporated polysiloxane. This sealing layer has been subject to corona treatment. After the three-layer polyolefin film has been prepared and wound-up, a relative polydimethylsiloxane occupancy of 7 on the corona-treated sealing layer has been determined by means of ESCA spectroscopy.

EXAMPLE 3

A sealing layer is composed of the polymer mixture mentioned in Example 2 and 2% by weight of polydimethylsiloxane having a viscosity of 30,000 mm²/second at 25° C. The other sealing layer corresponds to the corona-treated sealing layer of Example 1. The relative polydimethylsiloxane occupancy has a value of 10.

EXAMPLE 4

A sealing layer is composed of a (random) ethylene/propylene copolymer containing 4.5% by weight of ethylene, as the main component, as in Example 1, 0.5% by weight of polydimethylsiloxane having a viscosity of 5,000 mm²/second at 25° C., 10% by weight of an isotactic polypropylene having a fraction soluble in n-heptane of 4.5% by weight, a melting point of 160° C. and a melt flow index of 3 g/10 minutes at 230° C. and 2.16 kg loading, and 10% by weight of a hydrogenated polycyclopentadiene resin having a softening point of 125° C. The other sealing layer corresponds to the corona-treated layer of Example 1. The relative polydimethylsiloxane occupancy has a value of 2.

EXAMPLE 5

A sealing layer is composed of a polymer mixture, as the main component, as in Example 2, 3% by weight of polydimethylsiloxane having a viscosity of 50,000 mm²/second at 25° C., 10% by weight of an isotactic polypropylene having a fraction soluble in n-heptane of 4.5% by weight and a melting point of 165° C. and a melt flow index of 3 g/10 minutes at 230° C. and 2.16 kg loading, and 10% by weight of a hydrogenated hydrocarbon resin formed from vinyltoluene, α-methylstyrene and indene and having a softening point of 125° C. The other sealing layer corresponds to the corona-treated layer of Example 2. The relative polydimethylsiloxane occupancy has a value of 14.

COMPARISON EXAMPLE 1

Sealing layers corresponding to Example 1 of German Offenlegungsschrift No. 3,247,998 are employed.

COMPARISON EXAMPLE 2

Sealing layers corresponding to Example 4 of U.S. Pat. No. 4,419,411 are employed.

DETERMINATION OF THE RELATIVE POLYDIALKYLSILOXANE OCCUPANCY

The relative polydialkylsiloxane occupancy of the surface of the corona-treated sealing layer was determined by means of ESCA spectroscopy (ESCA = Electron Spectroscopy for Chemical Analysis). ESCA spectroscopy is a surface-specific method of analysis in which the kinetic energy of the electrons emitted by a surface under the influence of X-rays is measured. The determination was carried out using samples of the finished film, wound up in a customary manner, after it had remained in the wound-up state at room temperature for at least 60 minutes. The lines of the ESCA spectrum are designated by the energy levels emitted. The area under an ESCA line is proportional to the concentration of the appropriate element on the surface. The relative polydialkylsiloxane occupancy of the surface (RSO) is accordingly calculated by quoting the ratio of the area of the $Si2p_{3/2}$ to the $Cls_{\frac{1}{2}}$ line by means of the equation:

$$RSO = 40 \ (F_{Si2p_{3/2}}/F_{Cls_{\frac{1}{2}}})$$

where $F_{Si2p_{3/2}}$ is the area under the $Si2p_{3/2}$ line and $F_{Cls_{\frac{1}{2}}}$ is the area under the $Cls_{\frac{1}{2}}$ line. The factor 40 is a relative signal intensity factor.

The determinations were carried out using the ESCA instrument made by McPherson, U.S.A., "ESCA 36 photoelectronspectrometer".

DETERMINATION OF SCRATCH-RESISTANCE

(Sensitivity to Scratching)

The scratch-resistance is determined by a method modeled on DIN 53,754. The 11,671 abrasion tester made by Frank (West Germany) is used for the determination of scratch resistance, and frictional wheels of the brand CALIBRASE® CS-10F made by Teledyne, Taber, U.S.A., loaded with 250 g are employed. Scratch-resistance or sensitivity to scratching is to be understood as meaning the increase in the haze of the scratched film compared with the original film after 50 revolutions of the sample plate.

DETERMINATION OF SEAL STRENGTH

Two strips 15 mm wide were laid one above the other and were sealed at 130° C., a sealing time of 0.1 second and a sealing pressure of 0.15 bar. The seal strength was determined by the T peel method.

The properties of the three-layer polyolefin films of the examples and comparison examples are collated in the table below.

As the results show, the three-layer polyolefin films according to the invention are markedly superior to those of the state of the art. The films according to the invention alone fulfill the high requirements in respect of sealability on both sides, scratch-resistance and running characteristics (ease of travel on the machine) while having at the same time good printability, and they are thus distinguished by universal applicability on high-speed packaging machines.

TABLE

| Film properties | Sealability Side 1* | Sealability Side 2 | Scratch-resistance | Ease of travel on the machine | Printability |
|---|---|---|---|---|---|
| Example 1 | + | + | + | + | ++ |
| Example 2 | + | ++ | ± | + | ++ |
| Example 3 | + | ++ | ± | + | ++ |
| Example 4 | + | + | ++ | ++ | ++ |
| Example 5 | ++ | ++ | ++ | ++ | ++ |
| Comparison Example 1 | − | ++ | ++ | ++ | + |
| Comparison Example 2 | − | + | ± | + | + |

The abbreviations in the table have the following meanings:
+ good
++ very good
± adequate
− inadequate
*Side 1 = corona-treated

What is claimed is:

1. A biaxially oriented coextruded multilayer polyolefin film, comprising:
   a polypropylene base layer;
   a first polyolefin sealing layer positioned on one side of said base layer, and containing from about 0.5% to about 3% by weight of incorporated polydialkylsiloxane, said first sealing layer not being subject to corona treatment;
   a second polyolefin sealing layer positioned on the other side of said base layer, said second sealing layer being subjected to corona treatment and being substantially free of polydialkylsiloxane at the time of said corona treatment, and said second polyolefin sealing layer having a coating of polydialkylsiloxane on its outer surface, applied subsequent to said corona treatment;
   wherein said polydialkylsiloxane coating is formed by contact of said first and second sealing layers, the relative polydialkylsiloxane occupancy of said second sealing layer being not more than about 15 as determined by means of ESCA spectroscopy, wherein said multilayer polyolefin film is produced by a coextrusion process.

2. A polyolefin film as claimed in claim 1, wherein the amount of incorporated polydialkylsiloxane in said first layer is from about 0.8 to about 2% by weight.

3. A polyolefin as claimed in claim 1, wherein the relative polydialkysiloxane occupancy of said second layer is from about 2 to about 10.

4. A polyolefin film as claimed in claim 1, wherein said polydialkylsiloxane is a polydimethylsiloxane having a viscosity of from about 1,000 to about 100,000 $mm^2$/second at 25° C.

5. A polyolefin film as claimed in claim 1, wherein the olefin polymer of said sealing layers comprises an ethylene/propylene copolymer, an ethylene/butylene copolymer, a propylene/butylene copolymer, an ethylene/propylene/butylene terpolymer or a mixture of two or more of the above polymers.

6. A polyolefin film as claimed in claim 1, wherein at least one of said sealing layers contains from about 3 to about 15% by weight of a natural or synthetic resin having a softening point of from about 80° to 130° C. and from about 3 to about 15% by weight of a propylene homopolymer having a melting point of up to about 165° C., the percentages by weight relating to the weight of the layer.

7. A polyolefin film as claimed in claim 1, wherein at least one of said base layer and said sealing layers contains an N,N-bis-(2-hydroxyethyl($C_{10}$–$C_{20}$)-alkylamine, a polyether-modified polydiorganosiloxane or a mixture of the above as an antistatic agent.

8. A polyolefin film as claimed in claim 1, wherein said film has a thickness of from about 10 to about 50 μm, the sealing layers each being from about 0.2 to about 3 μm thick.

9. A packaging film useful in high-speed packaging, comprising the polyolefin film as claimed in claim 1.

10. A process for the preparation of a multilayer polyolefin film comprising a polypropylene base layer; a first polyolefin sealing layer positioned on one side of said base layer, and containing from about 0.5% to about 3% by weight of incorporated polydialkylsiloxane; a second polyolefin sealing layer positioned on the other side of said base layer, said second sealing layer being subjected to corona treatment and being substantially free of polydialkylsiloxane at the time of said corona treatment, and said second polyolefin sealing layer having a coating of polydialkylsiloxane on its outer surface, applied subsequent to said corona treatment; the relative polydialkylsiloxane occupancy of said second sealing layer being not more than about 15 as determined by means of ESCA spectroscopy, comprising the steps of:

producing said multilayer film by coextruding a plurality of melts corresponding to said layers of said multilayer film;
biaxially orienting the film;
subjecting said second sealing layer to corona treatment; and
arranging the film in a manner such that said first and second sealing layers contact each other sufficient to produce said coating of polydialkylsiloxane.

11. A process as claimed in claim 9, wherein said biaxial orientation step includes stretching the film biaxially at a longitudinal stretching ratio of from about 4:1 to about 7:1 and at a transverse stretching ratio of from about 8:1 to about 10:1, stretching said film first longitudinally and then transversely.

12. A process as claimed in claim 9, wherein said producing step includes the step of cooling the coextruded layers, and wherein said cooling step includes cooling and solidifying said film on one or more rolls maintained at a temperature of from about 30° C. to about 50° C.

13. A process as claimed in claim 10, wherein said biaxial orientation step is carried out at a temperature of from about 120° C. to about 140° C, and said transverse stretching is carried out at a temperature of from about 160° C. to about 175° C.

14. A process as claimed in claim 9, further comprising the step of heat-setting the biaxially oriented film, wherein said heat-setting step includes maintaining said film at a temperature of from about 150° C. to about 160° C. for a period of from about 0.5 to about 10 seconds.

15. A process as claimed in claim 9, wherein said corona treatment step includes exposing said film to an alternating voltage of about 10,000 volts and 10,000 Hertz.

16. A process as claimed in claim 9, wherein said arranging step comprises winding the film.

17. A biaxially oriented multilayer polyolefin film produced by the process as defined in claim 9.

* * * * *